F. PHELPS.
HIGH PRESSURE RELEASE VALVE.
APPLICATION FILED DEC. 11, 1911.
1,091,762.
Patented Mar. 31, 1914.
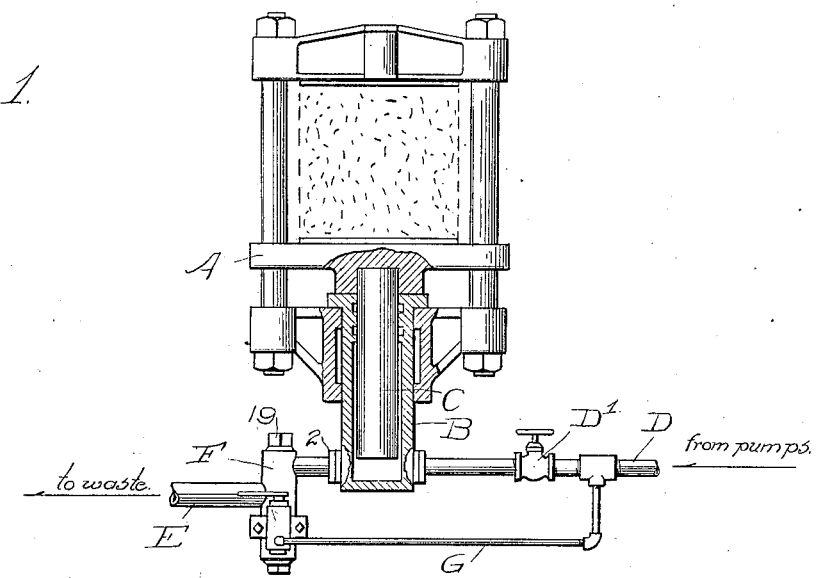
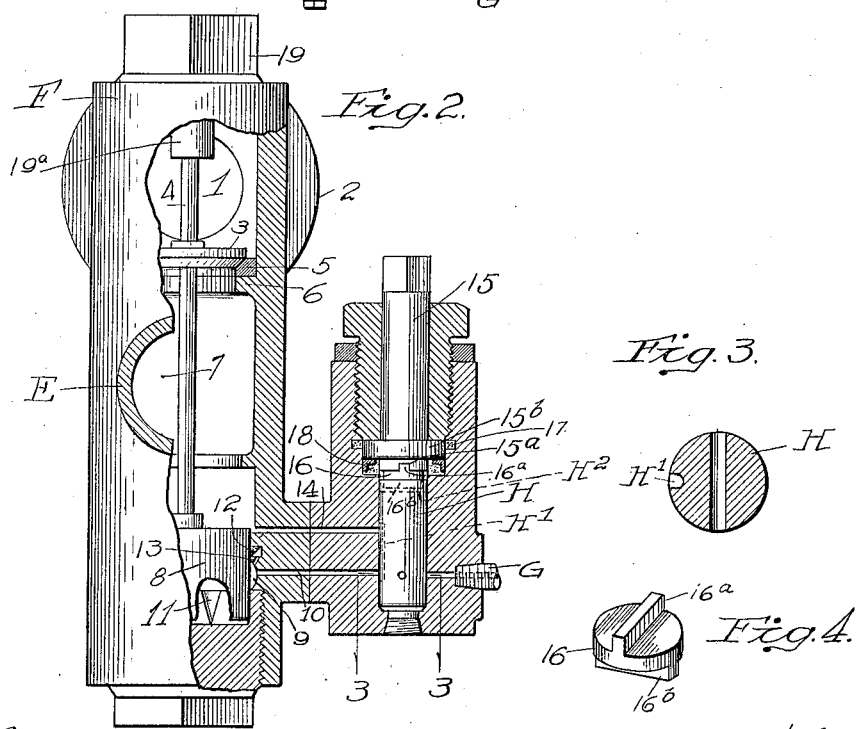
Witnesses:
Inventor:
FRANK PHELPS
By Burton & Burton
his Attys.

UNITED STATES PATENT OFFICE.

FRANK PHELPS, OF LITTLE ROCK, ARKANSAS.

HIGH-PRESSURE RELEASE-VALVE.

1,091,762.  Specification of Letters Patent.  Patented Mar. 31, 1914.

Application filed December 11, 1911. Serial No. 665,145.

*To all whom it may concern:*

Be it known that I, FRANK PHELPS, a citizen of the United States, residing at Little Rock, in the county of Pulaski and State of Arkansas, have invented new and useful Improvements in High-Pressure Release-Valves, of which the following is a specification, reference being had to the accompanying drawings, forming a part thereof.

The purpose of this invention is to provide a discharge valve adapted for use in hydraulic and similar machinery employing high pressures and designed to accomplish the prompt release of such pressures without the excessive "hammer" of reaction usually incident to such release.

It consists of the features and elements described and shown in the drawings and as indicated in the claims.

In the drawings:—Figure 1 is an elevation partly in section of a hydraulic press fitted with a release valve embodying this invention. Fig. 2 is an elevation partly in section of the release valve shown in Fig. 1. Fig. 3 is a detail section taken as indicated at line 3—3 on Fig. 2. Fig. 4 is a perspective view of the coupling member, 16.

Fig. 1 illustrates a familiar form of hydraulic press, A, such as may be used for baling cotton or like operations. It is provided with the usual pressure cylinder, B, and plunger, C, slidably carried therein; D, indicates the supply pipe leading from the pumps which furnish fluid under pressure, to the cylinder, B, for moving the plunger, C, therein, while a valve, $D^1$, in such pipe controls this supply. Leading out of the cylinder, B, there is shown a discharge or waste pipe, E, controlled by the release valve, F, which is the subject of this invention.

The view of the valve, F, shown in Fig. 2 is taken transversely to that of Fig. 1, and is shown largely in section to indicate the detail construction of the valve. The aperture, 1, which is concentric with the flange, 2, communicates with the interior of the cylinder, B, for discharge of the fluid therefrom. Such discharge is controlled by a valve, 3, carried upon a stem 4, and seating against a ring, 5, carried by an annular flange, 6, of the valve housing, F. Thus there are constituted within the housing, F, an upper chamber, comprising the space above the valve, 3, which is at all times in communication with the cylinder, B, and a lower chamber which communicates with the waste pipe, E, through an aperture, 7. The release of the fluid under pressure in the cylinder, B, will thus be accomplished through the unseating of the valve, 3; but since this fluid is under enormous pressure its release must be initiated very gradually in order to avoid serious reaction and shock to the mechanism.

The gradual release of the pressure and the discharge of the fluid under pressure in the cylinder, B, is accomplished by the very gradual opening or unseating of the valve, 3, and such gradual operation of the valve is due to the features of construction about to be described. The lower end of the valve stem, 4, has rigidly secured upon it a piston, 8, whose circular area is slightly greater than the area of the valve, 3, against which the pressure in the cylinder, B, acts when the valve is closed. By means of a by-pass pipe, G, leading from the supply pipe, D, back of the controlling valve, $D^1$, the fluid under high pressure from the pumps may be introduced under the piston, 8, so by virtue of the mean effective pressure arising in consequence of the difference between the areas of the piston, 8, and the valve, 3, the latter may be raised from its seat. As the piston, 8, stands in its lowest position (the valve, 3, being closed) it is surrounded by an annular groove, 9, which is formed in the housing, F, and which communicates through a port, 10, with the by-pass, G. Leading from this annular groove, 9, a V-shaped groove, 11, tapering downwardly, communicates at its lowest point with the small chamber or clearance space between the lower face of the piston, 8, and the bottom wall of the housing, F. Thus when the turn-cock, H, is set to open communication from the pipe, G, to the port, 10, this groove, 11, being of downwardly diminishing cross section admits the fluid under pressure very gradually at first, under the piston, 8, for initiating the upward movement of said piston and of the valve, 3, connected with it. During this operation all leakage of the fluid from the groove, 9, to any part of the valve chamber above the piston, 8, is prevented by an annular packing ring, 12, against which the fluid pressure is admitted through ducts, 13, in such a way as to force the ring, 12, strongly against the cylindrical surface of the piston, 8.

It may be understood that when discharge of the cylinder, B, is contemplated the valve, D¹, will be closed to prevent further supply of fluid under pressure from the pumps or where the pressure employed is so great that such a valve would be impracticable, the operation of the pumps would be suspended and upon the opening of the discharge valve, F, the system would be drained of all fluid. Then, it being desired to again close the valve, 3, the fluid which had been admitted under the piston, 8, for elevating it, may be drained off by turning the controlling valve, H, to the position in which it is shown in Fig. 2, such that the vertical groove, H¹, in its surface registers with the port or duct, 10, and also with a similar duct, 14, leading into the housing, F, above the packing ring, 13. Above the point at which this duct, 14, enters the housing the inside diameter of the latter is slightly greater than the diameter of the piston, 8, so as to permit the escape of the fluid through the clearance space thus formed between the piston and the housing wall, the weight of the piston itself being sufficient to cause it to drop and thereby force the fluid from its position beneath the piston in to the space above it.

The controlling valve, H, is preferably made in such a way that any strains caused by operation of the valve will not be communicated to the element, H, which is the valve proper. For this reason the operating stem, 15, is connected to the member, H, by a coupling member, 16, having protruding tongues, 16ᵃ and 16ᵇ, diametrically formed upon its upper and lower faces, respectively, and engaging corresponding grooves, 15ᵃ and H², diametrically arranged in the opposing ends of the stem and valve member, respectively. The upper end of the stem, 15, is squared to receive any desired form of hand wheel or lever, and by virtue of the loose coupling, 16, the rotation of the stem, 15, is communicated to the valve member, H, without any incident bending strains which might produce uneven wearing of the valve surfaces.

To insure the fitting against leakage the stem, 15, is provided with a flange, 15ᵇ, which is made water-tight by means of a packing ring, 17, encompassing the flange, and a combination of steel and other packing positioned below the flange at, 18. In the valve, F, the stem, 4, is guided at its upper end in an apertured boss, 19ᵃ, of a plug, 19, screwed in to the upper end of the housing, F.

I claim:—

1. A release valve for fluid-pressure pipes, comprising a valve casing having pressure and exhaust chambers and a single intermediate valve seat facing the pressure chamber; a valve normally seated upon said valve seat by the fluid pressure to prevent the flow through the pressure chamber; a piston of larger diameter than the valve and connected thereto, a cylinder for said piston, a V-shaped recess in the cylindrical wall of said cylinder having its apex positioned just below the piston when the valve is seated; a duct leading from the said recess, and means for admitting the fluid pressure to said duct for actuating the piston in a direction to unseat the valve.

2. A release valve for fluid pressure pipes, comprising a valve casing having pressure and exhaust chambers, and a single intermediate valve seat facing the pressure chamber, a valve normally seated upon said valve seat by the fluid pressure to prevent the flow through the pressure chamber, a piston of larger diameter than the valve and connected thereto, a cylinder for said piston, an inlet opening of graduated cross section formed in the cylinder wall and partially covered by the piston when the valve is seated, the portion of the opening having the smallest cross section being beyond the range of travel of the piston, and means for admitting the fluid pressure through said inlet opening for actuating the piston in a direction to unseat the valve.

3. A valve adapted for controlling high fluid pressure, comprising a cylindrically bored housing, a cylindrical valve member rotatably mounted therein, an operating stem journaled for rotation in the housing co-axially with the valve member; packing devices carried in the housing in contact with said operating stem, the adjacent ends of the stem and the valve member being provided with diametrical slots, respectively, and a coupling member formed with diametrically arranged projections on its opposite faces for engaging the slots, said projections extending transversely of each other.

4. A high pressure fluid controlling valve comprising a cylindrically bored housing provided with an inlet port and an outlet port disposed in diametrically opposite parts of its cylindrical bore, a cylindrical valve member, a valve stem and a coupling member, all mounted in approximate axial alinement, with the valve member positioned for controlling the ports of the housing and the coupling member interposed between the adjacent ends of the valve member and the stem, said stem being rotatably mounted within the housing, the opposite ends of the coupling and the aforesaid adjacent ends of the stem and the valve member being formed with mutually engaging grooves and projections diametrically arranged with respect to the axes of the respective parts, said features of the coupling extending along transverse diameters of said member.

5. A high pressure fluid controlling valve comprising a cylindrically bored housing, a cylindrical valve member rotatably mounted therein, the housing being provided with an inlet port and an outlet port disposed in diametrically opposite parts of the cylindrical bore thereof, operating means, and loose connecting means adapted to transmit rotation from said operating means to the valve member without restraint of the latter with respect to the action of the fluid pressure which has access to it through the inlet.

6. A release valve for fluid pressure pipes comprising a valve casing having pressure and exhaust chambers and an intermediate valve seat facing the pressure chamber, a valve normally seated upon said valve seat by the fluid pressure for preventing flow into the exhaust chamber, a piston of larger diameter than the valve connected thereto, a cylinder for said piston having an inlet adapted to be partially controlled by the movement of the piston, the cylinder being bored to afford a clearance between the piston head and the cylinder head at the limit of the piston stroke at which the valve is seated, the inlet to the cylinder being nearly closed at such limit of the piston travel, but with its slight remaining opening in communication with the said clearance space of the cylinder, and means for admitting the fluid pressure through said inlet opening for actuating the piston in a direction to unseat the valve.

In testimony whereof, I have hereunto set my hand at Little Rock, Ark., this 6th day of December, 1911.

FRANK PHELPS.

Witnesses:
  LUCY I. STONE,
  M. GERTRUDE ADY.

Copies of this patent may be obtained for five cents each, by addressing the "Commissioner of Patents, Washington, D. C."